United States Patent
Barrick et al.

(10) Patent No.: US 7,870,314 B2
(45) Date of Patent: Jan. 11, 2011

(54) METHOD AND SYSTEM FOR IMPLEMENTING STORE BUFFER ALLOCATION

(75) Inventors: Brian D. Barrick, Pflugerville, TX (US); Vimal M. Kapadia, New York, NY (US); Chung-Lung Kevin Shum, Wappinger Falls, NY (US); Aaron Tsai, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 12/031,897

(22) Filed: Feb. 15, 2008

(65) Prior Publication Data

US 2009/0210587 A1 Aug. 20, 2009

(51) Int. Cl.
*G06F 3/00* (2006.01)
(52) U.S. Cl. .......................................... 710/52; 710/56
(58) Field of Classification Search .................... 710/52, 710/56
See application file for complete search history.

(56) References Cited

U.S. PATENT DOCUMENTS

| | | | |
|---|---|---|---|
| 4,742,454 A | 5/1988 | Robinson et al. | |
| 5,781,192 A | 7/1998 | Kodimer | |
| 6,237,066 B1 | 5/2001 | Pan et al. | |
| 6,823,403 B2 * | 11/2004 | Gulick et al. | 710/22 |
| 6,876,664 B1 | 4/2005 | Bullis et al. | |
| 6,938,148 B2 | 8/2005 | Moore et al. | |
| 7,617,371 B2 * | 11/2009 | Fujimoto et al. | 711/165 |
| 2007/0185902 A1 * | 8/2007 | Messinger et al. | 707/103 R |

OTHER PUBLICATIONS

Z/Architecture, Principles of Operation, Sixth Edition, Apr. 2007, Publication No. SA22-7832-05, copyright IBM Corp. 1990-2007, pp. 1-1218.

* cited by examiner

*Primary Examiner*—Alford W Kindred
*Assistant Examiner*—David E Martinez
(74) *Attorney, Agent, or Firm*—Cantor Colburn LLP; John Campbell

(57) ABSTRACT

A method and system for implementing store buffer allocation for variable length store data operations are provided. The method includes receiving a store address request and at least one store data request and stepping through data operations for each of the store data requests and an address range for the store data requests to determine alignment and data steering information used to select a storage buffer destination for the data in the store data requests. The method further includes determining availability of the storage buffer by maintaining a reservation list for each storage buffer, maintaining a count of the number of available entries for each storage buffer, updating the reservation list to reflect a reservation acceptance for designated available entries, and clearing entries upon completion of the processing of store data operations. The method also includes reserving the selected storage buffer when the number of available entries meets or exceeds the number of entries required for the data.

10 Claims, 4 Drawing Sheets

METHOD AND SYSTEM FOR IMPLEMENTING STORE BUFFER ALLOCATION

BACKGROUND OF THE INVENTION

The present disclosure relates generally to computer processor instruction sequencing and, in particular, to a method and system for implementing store buffer resource allocation in support of variable length store data operations.

When store operations for high performance processors are issued, they require reserving resources to perform the storage operation. These resources generally consist of an address queue and a data queue. In many cases, the store data length is fixed and so the address and the data queues are reserved together. However, once the data length is no longer fixed (e.g., variable length stores), efficient allocation of store buffer resources becomes more difficult to manage.

One solution is to calculate the length of the data field at address generation time and reject the data if there are insufficient resources available to store it. This approach can be difficult to achieve in a high-frequency design and also requires that all buffer resources become available prior to starting the operation. Another approach is to move the allocation back to the issuing unit, such that accessing the data requires the allocation of a buffer tag. This approach allows for partial data to get through before resources are available, but does not allow for more intelligent buffer allocation, which may be aligned by memory address. This scheme has a higher latency due to the distance of the allocation to the releasing logic.

What is needed, therefore, is a buffer allocation scheme that can handle multiple data for each address queue allocated and can also allocate data buffers based on the destination of the store data.

BRIEF SUMMARY OF THE INVENTION

Embodiments of the invention include a method for implementing store buffer allocation for variable length store data operations. The method includes receiving a store address request and at least one store data request and stepping through data operations for each store data request and an address range for the store data request to determine alignment and data steering information used to select a storage buffer destination for the data in the store data request. The method further includes determining availability of the storage buffer by maintaining a reservation list for each storage buffer, maintaining a count of the number of available (i.e., free or unused) entries for each storage buffer, updating the reservation list to reflect a reservation acceptance for designated available entries, and clearing entries upon completion of the processing of store data operations. The method also includes reserving the selected storage buffer when the number of available entries meets or exceeds the number of entries required for the data.

Additional embodiments include a system for implementing store buffer allocation for variable length store data operations. The system includes a store execution unit implemented by a processor. The store execution unit performs a method. The method includes receiving a store address request and at least one store data request and stepping through data operations for each store data request and an address range for the store data request to determine alignment and data steering information used to select a storage buffer destination for the data in the store data request. The method further includes determining availability of the storage buffer by maintaining a reservation list for each storage buffer, maintaining a count of the number of available entries for each storage buffer, updating the reservation list to reflect a reservation acceptance for designated available entries, and clearing entries upon completion of the processing of store data operations. The method also includes reserving the selected storage buffer when the number of available entries meets or exceeds the number of entries required for the data.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

In accordance with an exemplary embodiment, a store buffer allocation scheme is provided that allows for variable length store data operations and provides the means for allocating store data buffers based on memory aligned data word (DW) requirements (e.g., destination of the store data) is provided. The store buffer allocation scheme allows for partial data operations to be accepted by store data buffer logic, and also allows for store buffers to be managed by memory aligned addressing, which can be advantageous from a physical design point of view.

Figure 1:
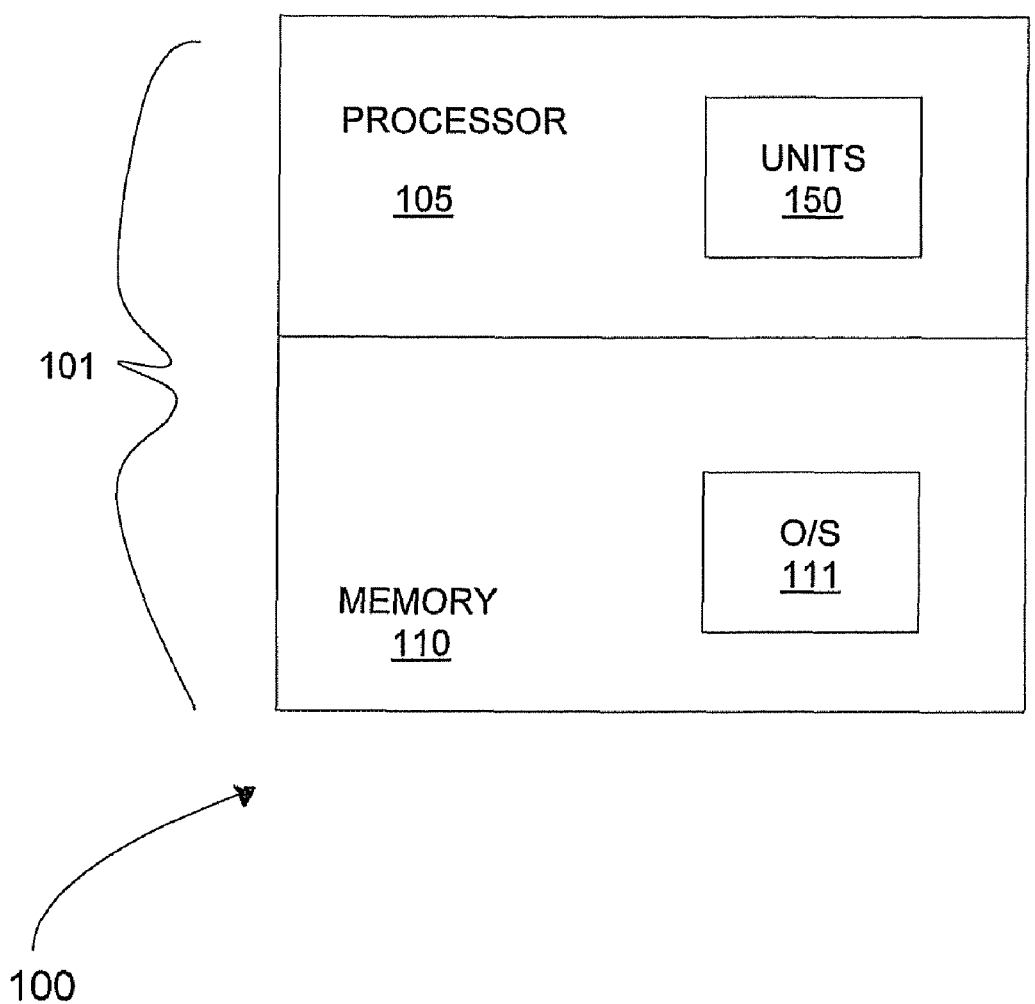
FIG. 1 is a block diagram illustrating a system upon which exemplary store buffer allocation may be implemented.

Turning now to FIG. 1, a system 100 upon which the store buffer allocation processes may be implemented in accordance with an exemplary embodiment will now be described. The processes described herein can be implemented in hardware software (e.g., firmware), or a combination thereof. In an exemplary embodiment, the processes described herein are implemented in hardware, and is part of the microprocessor of a special or general-purpose digital computer, such as a personal computer, workstation, minicomputer, or mainframe computer. The system 100 therefore includes general-purpose computer 101.

In an exemplary embodiment, in terms of hardware architecture, as shown in FIG. 1, the computer 101 includes a processor 105 and memory 110. The processor 105 is a hardware device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 105 may include one more units 150, e.g., instruction fetch units (IFUs), instruction dispatch units (IDUs), execution units, and load store units (LSUs), among other units.

An instruction can transition through stages of: fetching, dispatching, execution, and retirement. Fetching acquires an instruction from memory, such as an instruction cache. Dispatching controls when the instruction is sent to an execution unit. Execution can be performed in different units depending upon the type of instruction, e.g., fixed point versus floating point. The instruction can complete execution in one cycle or in multiple cycles, again depending upon the instruction type. Upon execution completion, the result is put away to the destination register or memory location. The instruction is retired at the end of an operation, making any final changes to the state of the processor 105 and performing instruction checkpointing to capture a known good state of the processor 105.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

The store buffer allocation processes described herein are part of the processor 105 (e.g., may be part of an instruction dispatch unit (IDU), an instruction execution unit that includes, e.g., a load store unit (LSU), which collectively comprise units 150).

When the computer 101 is in operation, the processor 105 is configured to execute instructions stored within the memory 110, to communicate data to and from the memory 110, and to generally control operations of the computer 101 pursuant to the instructions.

In an exemplary embodiment, where the store buffer allocation processes are implemented in hardware, the store buffer allocation processes described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
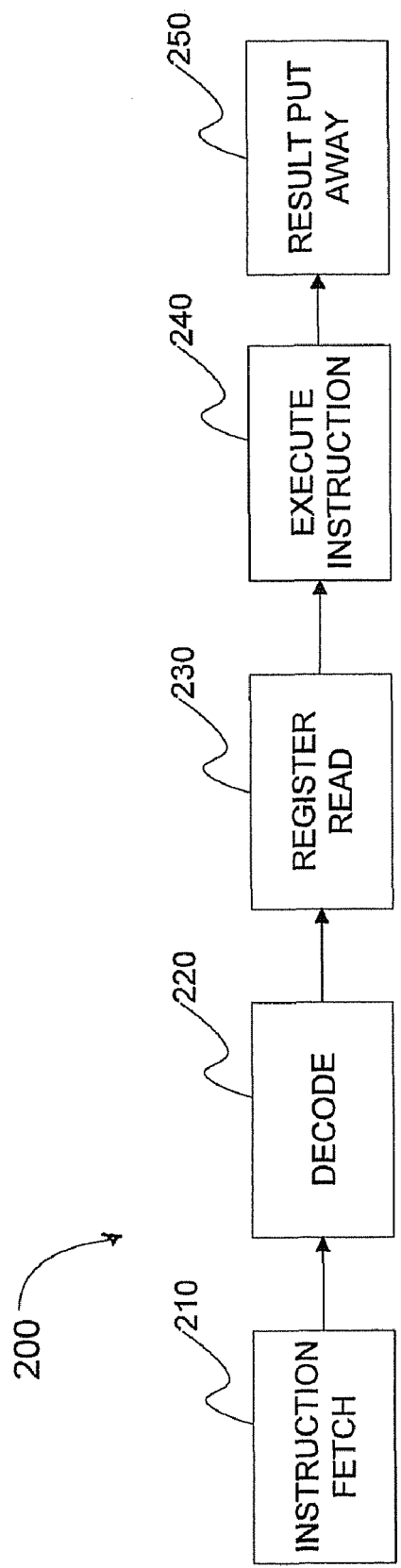
FIG. 2 is a pipeline used in implementing the store buffer allocation processes in accordance with an exemplary embodiment.

FIG. 2 illustrates a block diagram of a processor instruction pipeline system 200 in which the exemplary store buffer allocation processes can be implemented in accordance with an exemplary embodiment. As described above, the simplest way to speed up the processor 105 operation is to pipeline it. Pipelining is one specific form of parallelism, where the execution of several instructions can be interleaved on the same hardware. In an exemplary embodiment, the pipeline system 200 includes five stages: (1) Instruction fetch 210; (2) Decode 220; (3) Register read 230; (4) Execute instruction 240; and (5) Result put away 250. In an exemplary embodiment, the instruction fetch 210 stage fetches instructions to be processed. The Decode 220 stage decodes the instruction. The Register read 230 stage performs any register read functions associated with the instruction. The Result put away 250 stage writes a resulting value into one or more registers or memory, depending upon the type of instruction. As described above, the pipeline system 200 can be enhanced by the store buffer allocation processes (e.g., between stages 230 and 240) by handling multiple data for each address queue allocated and allocating data buffers based on the destination of the store data. These processes are described further herein.

Figure 3:
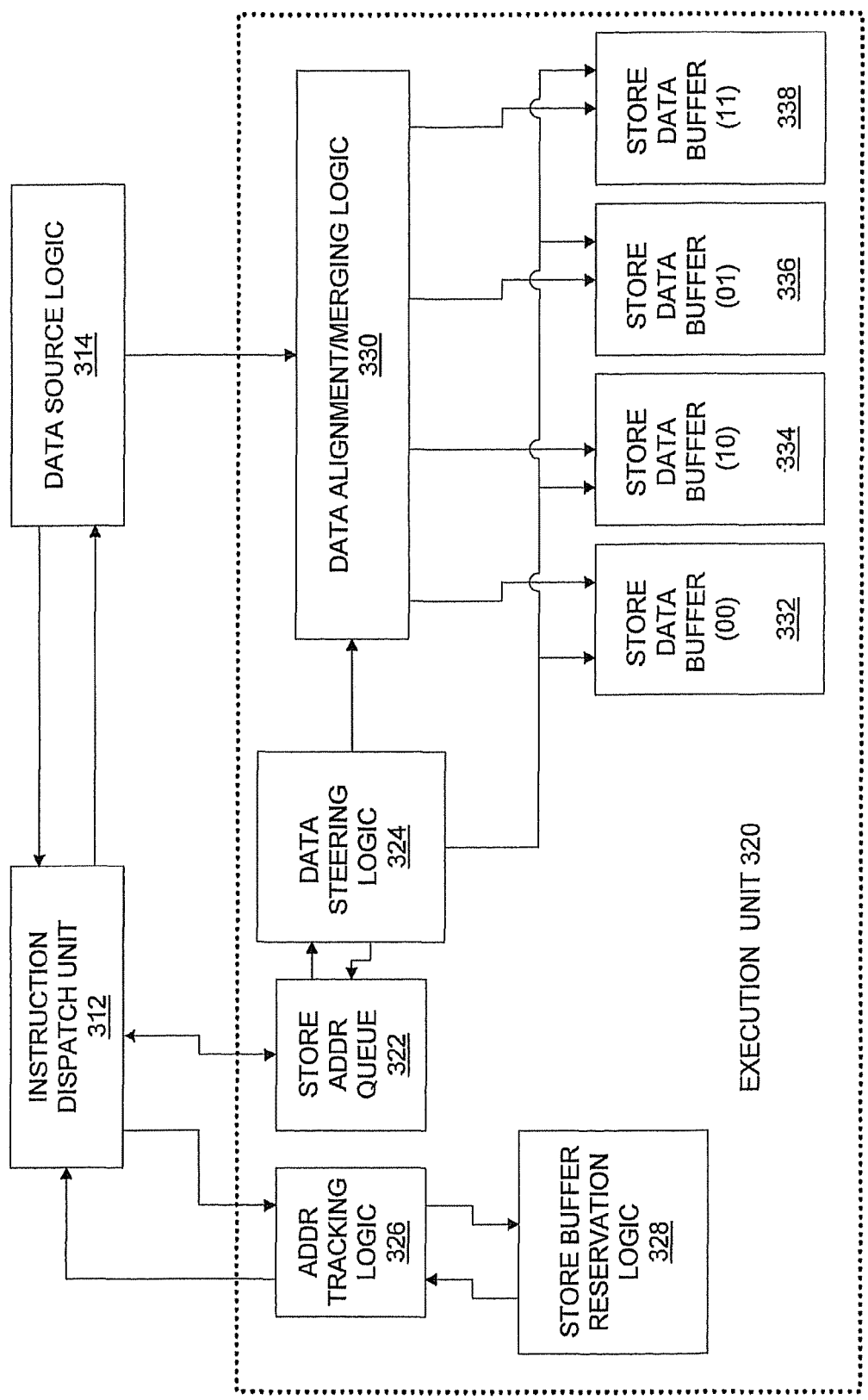
FIG. 3 is a block diagram illustrating various components including a store execution unit used in implementing the store buffer allocation processes in an exemplary embodiment.

Turning now to FIG. 3, a block diagram illustrating various components used in implementing the store buffer allocation processes will now be described in an exemplary embodiment. The store buffer allocation components of FIG. 3 include an instruction dispatch unit (IDU) 312. The IDU 312 includes logic configured to send instructions out for store address generation (agen) and store data. In addition, data source logic 314 is provided, which may be a fixed-point/floating point unit or a cache reader. The data source logic 314 receives requests from the IDU 312 to provide a data beat (e.g., up to 8 bytes) for a given store operation. The store buffer allocation components further include a store execution unit (STQ) 320, which takes both store agen requests and store data requests. The STQ 320 is further broken down to include address tracking logic 326, store address queue logic 322, data steering logic 324, store buffer reservation logic 328, data alignment/merging logic 330, and four memory-aligned data word (DW) store data buffers (332, 334, 336, and 338).

The store address queue 322 accepts store agen requests from the IDU 312 and saves off the address range associated with the full store requests; that is, the address range is stored in a register to be used later, as described below. The data steering logic 324 takes the address saved off in the store address queue 322 and steps through the data operations when data comes in from the data source logic 314. In other words, the address coinciding with the incoming data beat is maintained. The address saved off in the register is copied over to the data steering logic 324 as the data comes in (e.g., with each data beat that comes in, the data steering logic 324 increments the address so that it can steer the data based on the address location to which the current beat will be sent, as well as to determine when the end of the store range has been reached (in order to determine the number of bytes that are being stored).

The data steering logic 324 provides alignment and data steering information required to move data to the appropriate store data buffer (i.e., one of buffers 332, 334, 336, or 338). The address tracking logic 326 accepts the start address from the IDU 312 and monitors requests sent from the IDU 312 to the data source logic 314 as well as the store buffer reservation logic 328. The address tracking logic 326 steps through the range of addresses as the data request is sent to the data source logic 314 and sends a memory aligned buffer reservation request to the store buffer reservation logic 328. The store buffer reservation logic 328 takes reservation requests from the address tracking logic 326 and maintains a status bit for each entry of the store buffers 332, 334, 336, and 338. The status bit indicates whether the entry is reserved or available.

The data alignment/merging logic 330 takes data from the data source logic 314 and aligns and steers data to line up with the memory aligned store data buffers. The data alignment/merging logic 330 also takes input from the data steering logic 324 to determine alignment and merging requirements. The store data buffers 332, 334, 336, and 338 each provide a buffer location for store data coming in from the data source logic 314. The store data buffer 332 is aligned to even cache line and even double-word data. The store data buffer 334 is aligned to odd cache line and even double-word data. The store data buffer 336 is aligned to even cache line and odd double-word data. The store data buffer 338 is aligned to odd cache line and odd double-word data. As shown in FIG. 3, e.g., the alignment indicator for buffer 332 is '00', the alignment indicator for buffer 334 is '10', the alignment indicator for buffer 336 is '01', and the alignment indicator for buffer 338 is '11'.

In an exemplary embodiment, as data requests are made, the address tracking logic 326 tracks the appropriate address for the request until the last data reservation is made. The address tracking logic 326 and the data steering logic 324 share similar logic to determine the destination of the data except that the data steering logic 324 is initiated later in the pipeline 200 and is fed by the address tracking logic 326 instead of the instruction dispatch logic 312. For each of the store data buffers 332, 334, 336, and 338, the store buffer reservation logic 328 maintains a reservation list and a valid list. The reservation list is initiated by the address tracking logic 326 and cleared by a rejection or completion of the appropriate data buffer entry. The store buffer reservation logic 328 also maintains a count of the number of available buffer entries (not necessarily all, but the number necessary to cover latency back and forth between the address tracking logic). The address tracking logic 326 uses these available entry counts to determine how to reject. The address tracking logic 326 determines where to reserve, tracks the number of reservation requests that are in flight, and compares these numbers against the number of available data buffer locations. If the available data buffer locations are less than the number reservation requests in flight plus the incoming request, the request is rejected to the instruction dispatch logic 312. If the request is rejected, the instruction dispatch logic 312 continues to re-issue the request until the reservation is accepted. The data is allowed to pass for any part of the store operation which has received a reservation and is not rejected for any other reasons. Once all data has received reservations and is sent from the data source logic 314, the operation may be executed and the store buffer locations utilized in furtherance of the execution.

Figure 4:
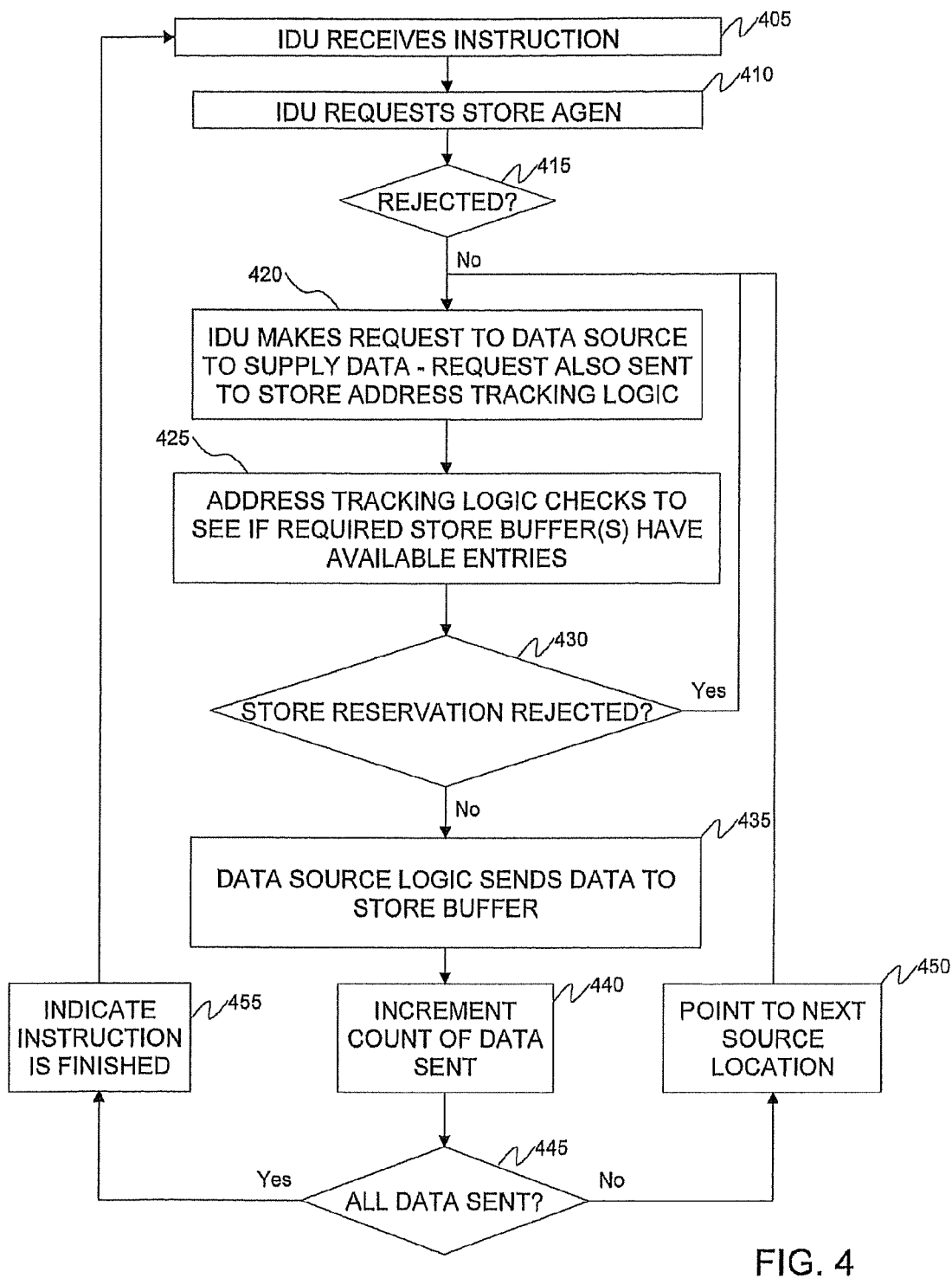
FIG. 4 is a flow diagram describing a process for implementing the store buffer allocation in an exemplary embodiment.

Turning now to FIG. 4, a flow diagram describing the store buffer allocation processes will now be described in accordance with an exemplary embodiment. The flow diagram describes the flow of a store operation into the store queue/store buffer. The process begins at step 405 where an instruction is received. This step may be performed by, e.g., instruction dispatch logic of IDU 312. This step may also include decoding the received instruction, identifying the appropriate execution unit to execute the instruction, and passing the received instruction to the identified execution unit. This step may also identify dual-issue instructions which are passed on to multiple execution units.

At step 410, a request is made by the IDU 312 for a store address generation (agen) checking, which is performed by, e.g., store address queue 322. At step 415, a determination is made as to whether the store address queue 322 is able to accept and process the store agen (i.e., whether the store address queue 322 has any available store queue entries). If not, the store agen request is rejected at step 415 and sent back to the IDU 312. If accepted, the address for the instruction is generated (e.g., within the IDU 312), and the IDU 312 proceeds to the data portion of the store operation as described next.

At step 420, the IDU 312 begins the data portion of the operation. The data portion of the store operation includes one or more store data requests. A request is made to the data source logic 314 and at the same time, a store buffer reservation request is made to the address tracking logic 326. The address tracking logic 326 receives requests from the IDU 312 and determines which of the data buffers to reserve the data for based upon memory location. In one embodiment, the first iteration of step 420 may be made at the same time as step 410, but must allow for the store agen rejection to be handled over the store reservation rejection determination step 430 described below. In step 425, the address tracking logic 326 determines which store buffer entries are required based on the address it is tracking and checks to see if the required buffer(s) are available. If none of the required buffers are available, a rejection decision for the address will be rendered. If, however, all required buffers are available, the buffers are reserved for the data. The store buffer reservation logic 328 holds the data buffer reservations, as well as tracks which data buffer entries are contain valid data. The data steering logic 324 handles steering the incoming data from the data source logic 314 into the appropriate data buffer. In particular, at step 430, the aforementioned determination is made on the available buffers. If any required buffers are not available at step 430, a rejection will be sent back to the IDU 312 and the data request of step 420 is repeated. If, however, the required buffers are available, the IDU 312 and data source logic 314 proceed to step 435.

At step 435, the data source logic 314 sends the indicated data over to the designated store buffer(s) (one of buffers 332, 334, 336, and 338). The data source logic 314 may consist of, e.g., reading values from registers or making memory load requests that would provide data for the store operation. The store address queue 322 provides steering information to the data steering logic 324, which handles alignment and steering of the data into the appropriate data buffers 332, 334, 336, and 338. At step 440, the IDU 312 increments its count of the number of data beats to send out and proceeds to the step 445.

At step 445, the IDU 312 determines whether all data for the operation has been sent. If all data has been sent, the IDU 312 indicates that all data has finished at step 445 and proceeds to the next instruction (i.e., the process returns to step 405). If, however, all data has not been sent, the IDU 312 points to the next source location at step 450 and the process returns to step 420.

The technical effects of the invention provide for store buffer allocation processes, which upon address generation, utilize logic for tracking necessary address bits and steps through with the data operation, such that the appropriate data buffer entry may be reserved. In this way, the desired data buffer required is reserved for the appropriate data beat. This allows the complexity of the system to be managed while allowing the data buffers to contain just enough entries to support the longest store operations. In these store buffer allocation processes, the data operation is passed through the pipeline and the address tracking logic determines which buffer entry to request. If the requested buffer is not available, the particular data beat is rejected and sent back through the pipeline (rather than stalling the pipeline). This rejection allows the pipeline to flow more naturally and avoid adding stall conditions.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for implementing store buffer allocation for variable length store data operations, comprising:
    receiving a store address request and at least one store data request in response to an instruction to perform a store operation;
    saving an address range for the store address request;
    stepping through data operations for each of the store data requests and the address range for the store address request to determine alignment and data steering information used to select a storage buffer destination for the data in each of the store data requests;
    determining availability of the storage buffer by:
        maintaining a reservation list for each storage buffer;
        maintaining a count of the number of available storage buffer entries for each storage buffer;
        updating the reservation list to reflect a reservation acceptance for designated available storage buffer entries, the updating resulting in a decrease in the count of available storage buffer entries; and
        clearing storage buffer entries upon completion of the processing of store data operations; and
    reserving the selected storage buffer when the number of available storage buffer entries meets or exceeds the number of storage buffer entries required for the data.

2. The method of claim 1, further comprising:
    rejecting the store data request when the number of available storage buffer entries is less than the number of storage buffer entries required for the data.

3. The method of claim 2, further comprising:
    re-issuing the store data request until the store data request is accepted in response to determining that the number of available storage buffer entries meets or exceeds the number of storage buffer entries required for the data.

4. The method of claim 1, wherein determining a storage buffer location further comprises:
    maintaining a status bit for each entry of each of the storage buffers, the status indicating the availability of the entry for storing data.

5. The method of claim 1, wherein the storage buffer location is determined by the address range, wherein:
    a first data buffer is aligned to even cache line and even double-word data;
    a second data buffer is aligned to odd cache line and even double-word data;
    a third data buffer is aligned to even cache line and odd double-word data; and
    a fourth data buffer is aligned to odd cache line and odd double-word data.

6. A system for implementing store buffer allocation for variable length store data operations, comprising:
    a store execution unit implemented by a processor, the store execution unit performing a method, comprising:
    receiving a store address request and at least one store data request in response to an instruction to perform a store operation;
    saving an address range for the store address request;
    stepping through data operations for each of the store data requests and the address range for the store address request to determine alignment and data steering information used to select a storage buffer destination for the data in each of the store data requests;
    determining availability of the storage buffer by:
        maintaining a reservation list for each storage buffer;
        maintaining a count of the number of available storage buffer entries for each storage buffer;
        updating the reservation list to reflect a reservation acceptance for designated available storage buffer entries, the updating resulting in a decrease in the count of available storage buffer entries; and
        clearing storage buffer entries upon completion of the processing of store data operations; and
    reserving the selected storage buffer when the number of available storage buffer entries meets or exceeds the number of storage buffer entries required for the data.

7. The system of claim 6, wherein the store execution unit further performs:
    rejecting the store data request when the number of available storage buffer entries is less than the number of storage buffer entries required for the data.

8. The system of claim 7, wherein the store execution unit further performs:
    re-issuing the store data request until the store data request is accepted in response to determining that the number of available storage buffer entries meets or exceeds the number of storage buffer entries required for the data.

9. The system of claim 6, wherein determining a storage buffer location further comprises:
    maintaining a status bit for each entry of each of the storage buffers, the status indicating the availability of the entry for storing data.

10. The system of claim 6, wherein the storage buffer location is determined by the address range, wherein:
- a first data buffer is aligned to even cache line and even double-word data;
- a second data buffer is aligned to odd cache line and even double-word data;
- a third data buffer is aligned to even cache line and odd double-word data; and
- a fourth data buffer is aligned to odd cache line and odd double-word data.

* * * * *